(12) United States Patent
Takahashi et al.

(10) Patent No.: US 11,804,975 B1
(45) Date of Patent: Oct. 31, 2023

(54) ATTENTIVE LISTENING IN MULTIPLE ONLINE MEETINGS

(71) Applicant: INTERNATIONAL BUSINESS MACHINES CORPORATION, Armonk, NY (US)

(72) Inventors: Miho Takahashi, Tokyo (JP); Tkashi Nerome, Yokohama (JP); Fumihiko Kitayama, Sagamihara (JP); Mikio Kurihara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/933,996

(22) Filed: Sep. 21, 2022

(51) Int. Cl.
*H04L 12/18* (2006.01)

(52) U.S. Cl.
CPC ...... *H04L 12/1831* (2013.01); *H04L 12/1822* (2013.01)

(58) Field of Classification Search
CPC .................. H04L 12/1831; H04L 12/1822
See application file for complete search history.

(56) References Cited

U.S. PATENT DOCUMENTS

| | | | |
|---|---|---|---|
| 9,148,627 B2 * | 9/2015 | Anderson | H04N 7/15 |
| 9,292,814 B2 * | 3/2016 | Bentley | G06Q 10/06311 |
| 10,720,161 B2 | 7/2020 | Castelli | |
| 11,601,480 B1 * | 3/2023 | Panchaksharaiah | H04L 65/1069 |
| 2011/0270921 A1 | 11/2011 | Jones | |
| 2012/0110475 A1 * | 5/2012 | Han | H04L 12/1818 715/753 |
| 2012/0128146 A1 * | 5/2012 | Boss | H04M 3/564 379/202.01 |
| 2013/0329866 A1 | 12/2013 | Mai | |
| 2016/0073056 A1 | 3/2016 | Katzman | |
| 2021/0400142 A1 | 12/2021 | Jorasch | |

FOREIGN PATENT DOCUMENTS

JP     2006237864 A     9/2006

OTHER PUBLICATIONS

"OVice Help Center," downloaded from the internet Aug. 12, 2022, 3 pages.
"OVice Natural Communications Online," downloaded form the internet Aug. 15, 2022, 9 pages.
"SpatialChat Internet Watch," downloaded from the internet Aug. 12, 2022, 11 pages.

* cited by examiner

*Primary Examiner* — John A Follansbee
*Assistant Examiner* — Raqiul A Choudhury
(74) *Attorney, Agent, or Firm* — Eric W. Chesley (57) ABSTRACT

A method, system, and computer program product for attentive listening in multiple contemporaneous meetings. The method identifies a set of keywords designated by a host of a meeting. Remarks in a set of sub-meetings of the meeting are monitored. One or more remarks of interest are identified which match one or more keywords within the remarks of a sub-meeting of the set of sub-meetings. Each sub-meeting has a meeting designation. The one or more remarks of interest are determined to exceed an interest threshold. The method presents the meeting designation and a remark indication to the host in response to determining the one or more remarks of interest exceed the interest threshold.

20 Claims, 6 Drawing Sheets

ATTENTIVE LISTENING IN MULTIPLE ONLINE MEETINGS

BACKGROUND

Online and remote meetings have become commonplace in education, business, and many other types of interactions. Online meetings are often conducted by a host or sub-host. Hosts and sub-hosts often have privileges or functionality unavailable to other meeting attendees. Some online meetings enable hosts or sub-hosts to establish breakout rooms or sub-meetings allowing portions of the meeting attendees to converse or interact outside of the full set of meeting attendees. This breakout room or sub-meeting functionality enables a larger scale meeting to divide into individual sessions which may cover differing topics simultaneously. These sub-meetings may be planned in advance or occur organically as the full meeting progresses. Permissions or functionality of the host or sub-host may be maintained or divided during these sub-meetings or breakout sessions.

SUMMARY

According to an embodiment described herein, a computer-implemented method for attentive listening in multiple contemporaneous meetings is provided. The method identifies a set of keywords designated by a host of a meeting. Remarks in a set of sub-meetings of the meeting are monitored. One or more remarks of interest are identified which match one or more keywords within the remarks of a sub-meeting of the set of sub-meetings. Each sub-meeting has a meeting designation. The one or more remarks of interest are determined to exceed an interest threshold. The method presents the meeting designation and a remark indication to the host in response to determining the one or more remarks of interest exceed the interest threshold.

According to an embodiment described herein, a system for attentive listening in multiple contemporaneous meetings is provided. The system includes one or more processors and a computer-readable storage medium, coupled to the one or more processors, storing program instructions that, when executed by the one or more processors, cause the one or more processors to perform operations. The operations identify a set of keywords designated by a host of a meeting. Remarks in a set of sub-meetings of the meeting are monitored. One or more remarks of interest are identified which match one or more keywords within the remarks of a sub-meeting of the set of sub-meetings. Each sub-meeting has a meeting designation. The one or more remarks of interest are determined to exceed an interest threshold. The operations present the meeting designation and a remark indication to the host in response to determining the one or more remarks of interest exceed the interest threshold.

According to an embodiment described herein, a computer program product for attentive listening in multiple contemporaneous meetings is provided. The computer program product includes a computer-readable storage medium having program instructions embodied therewith, the program instructions being executable by one or more processors to cause the one or more processors to identify a set of keywords designated by a host of a meeting. Remarks in a set of sub-meetings of the meeting are monitored. One or more remarks of interest are identified which match one or more keywords within the remarks of a sub-meeting of the set of sub-meetings. Each sub-meeting has a meeting designation. The one or more remarks of interest are determined to exceed an interest threshold. The computer program product presents the meeting designation and a remark indication to the host in response to determining the one or more remarks of interest exceed the interest threshold.

DETAILED DESCRIPTION

The present disclosure relates generally to methods for attentive listening in online meetings. More particularly, but not exclusively, embodiments of the present disclosure relate to a computer-implemented method for automatically supporting attentive listening in multiple contemporaneous or simultaneous meetings. The present disclosure relates further to a related system for attentive listening in online meetings, and a computer program product for operating such a system.

Online meetings are conducted by a host or sub-host. Hosts often have privileges or functionality unavailable to other meeting attendees, with sub-hosts sharing at least a portion of those privileges or functionality. While conducting a large meeting, hosts or sub-hosts may plan or choose to establish breakout rooms or sub-meetings. These breakout or sub-meetings may be established for smaller groups of meeting attendees to discuss topics or concepts presented in the larger meeting or to discuss individual topics and provide information on those topics to the larger meeting once it has been reconvened.

As multiple breakout or sub-meetings take place, hosts or sub-hosts traditionally rely on periodic attendance or reporting from attendee groups of individual breakout or sub-meetings to monitor the progress or conduct of these groups. However, periodic, scheduled, or random attendance of sub-meetings often miss matters of interest from the host viewpoint or matters of confusion from the attendee viewpoint. Further, hosts may miss matters of interest in multiple sub-meetings as a whole. While some hosts engage sub-hosts to share monitoring tasks in differing sub-meetings. However, engaging sub-hosts can increase overhead in cost, communication time, and coordination between host and a group of sub-hosts. As breakout or sub-meeting sessions end, hosts in current systems often rely on a representative of each sub-meeting to discuss or summarize the contents of each sub-meeting to ensure attendee groups engaged in designated discussions or tasks. However, explanation of sub-meeting contents by individual representatives provide limited confirmation of attendee participation and participation quality. Further, such explanations increase time and redundancy in the larger meeting and discussion.

The present disclosure provides an automated mechanism for attentive listening of breakout or sub-meetings by hosts or sub-hosts. The automated mechanism enables attentive listening by hosts or sub-hosts of contemporaneous or simultaneous sub-meetings. Attentive listening enables the host to step into conversation specifics in meetings, based on selected meeting purposes. Attentive listening enables identification of a matter of interest in contemporaneous sub-meetings with differing meeting participants, communicating with a host about the meeting, and automatically adjusting parameters to enable the host to interact with a suitable sub-meeting. The attentive listening mechanism enables the host to engage in attentive listening following and attentive listening sharing, to follow and engage with remarks in a sub-meeting and designate a sub-host to observe or interact with specified sub-meetings. Some embodiments of the attentive listening mechanism automates sub-host participation in multiple meetings in a manner similar to the host and enabling automatic identification of sub-meeting audio output to an audio output device of a host's computing device when a host designates additional sub-hosts. The present disclosure enables the host to designate sub-hosts for attentive listening sharing, such that individual sub-hosts are provided attentive listening functionality similar to the host or for designated matters of interest. Attentive listening sharing may include progressively listening to sub-meetings, where multiple sub-meetings contain remarks of interest, and assigning sub-hosts to listen to or interact with individual sub-meetings as remarks of interest occur, such that sub-hosts have different criteria for attentive listening than the host. Attentive listening following enables the same criteria for attentive listening for host and sub-hosts or sub-hosts, such that sub-hosts are able to listen to remarks of interest in sub-meetings and remarks of interest by the host or other sub-hosts.

The present disclosure enables automated monitoring of concepts and keywords of interest within a plurality of contemporaneous or simultaneous sub-meetings. Embodiments of the present disclosure automatically respond to concepts and keywords of interest within sub-meeting remarks by modifying user interfaces of hosts and sub-hosts. The present disclosure modifies user interfaces to identify sub-meetings of interest based on remarks and weighted remarks uttered or textual. Embodiments of the present disclosure automatically modifies user interfaces of hosts and sub-hosts to present by audio and/or video a sub-meeting containing remarks of interest.

Embodiments of the present disclosure automatically modify user interfaces for attentive listening by reducing audio or minimizing video displays to prevent distraction caused by multiple sub-meeting input streams. The present disclosure enables attentive listening to multiple sub-meetings by responding to remarks of interest within sub-meetings and providing automated and interactive presentations of sub-meetings and enabling varying levels of host permissions to travel with the host or sub-hosts across different sub-meetings.

The present disclosure enables users to engage with multiple meetings based on level of interest. In some embodiments, the present disclosure enables users to selectively participate in multiple meetings using automated attentive listening to allow the user to switch or toggle between meetings based on remarks of interest detected in real time. Such embodiments enable a user, engaging in a meeting of lower interest, to change meeting attendance in response to remarks of interest being uttered or covered in a meeting which may be of higher interest to the user, based on a user's established profile.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
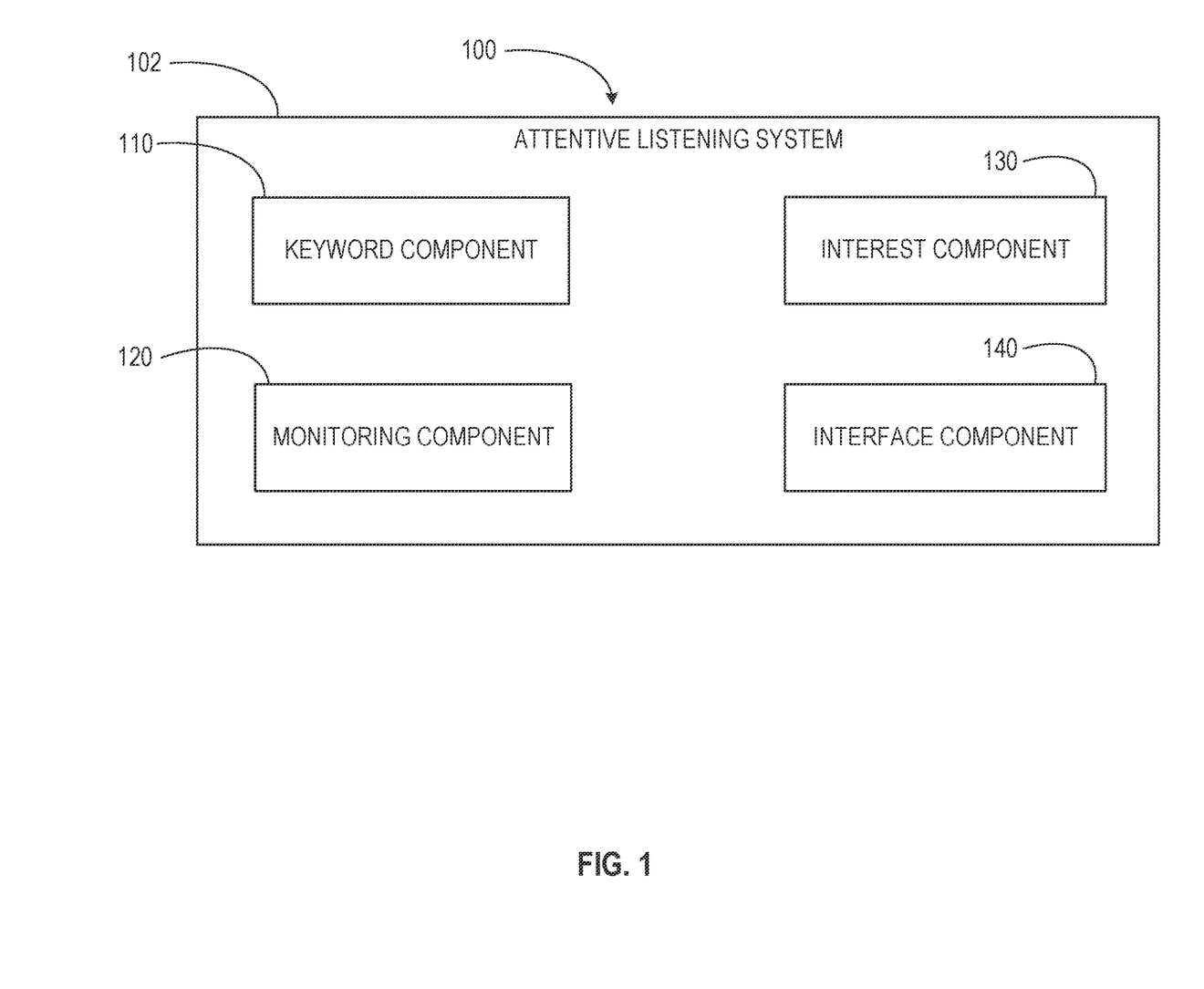
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an attentive listening system 102. The attentive listening system 102 may comprise a keyword component 110, a monitoring component 120, an interest component 130, and an interface component 140. The keyword component 110 identifies keywords and extended keywords for comparison to remarks within meetings. The monitoring component 120 monitors a plurality of simultaneous sub-meetings for remarks for evaluation by the attentive listening system 102. The interest component 130 identifies remarks of interest from monitored remarks based on identified keywords from the keyword component 110. The interface component 140 presents sub-meeting and remarks of interest information to hosts and sub-hosts of a meeting and automatically or interactively modifies user interfaces to enable attentive listening of individual sub-meetings from a set of simultaneous sub-meetings. Although described with distinct components, it should be understood that, in at least some embodiments, components may be combined or divided, and/or additional components may be added without departing from the scope of the present disclosure.

Figure 2:
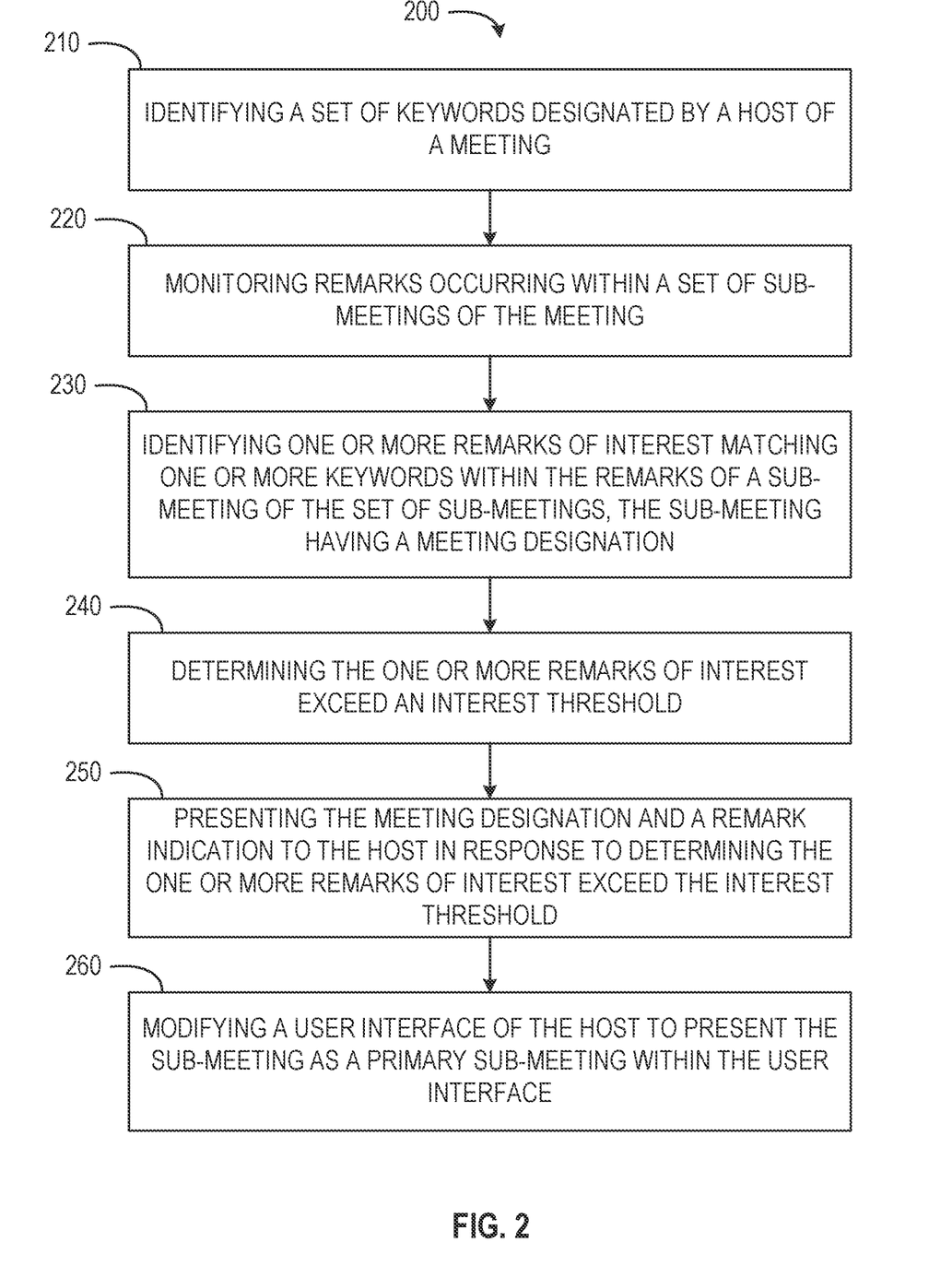
FIG. 2 depicts a flow diagram of a computer-implemented method for attentive listening in multiple contemporaneous meetings, according to at least one embodiment.

Referring now to FIG. 2, a flow diagram of a computer-implemented method 200 is shown. The computer-implemented method 200 is a method for attentive listening in multiple contemporaneous meetings. In some embodiments, the computer-implemented method 200 may be performed by one or more components of the computing environment 100, as described in more detail below.

At operation 210, the keyword component 110 identifies a set of keywords. The set of keywords may be designated by a host of a meeting. In some embodiments, the set of keywords are identified from one or more input or selections by the host of the meeting prior to initiation of the meeting. In some instances, the set of keywords are identified from one or more input or selections by the host prior to initiation of the sub-meetings. The set of keywords may also be identified from an established file or profile containing keywords and associated information. The set of keywords may be identified with weighted values for each keyword, for subsets of keywords, or for the set of keywords.

In some embodiments, the host of a meeting is a primary host or primary meeting participant. The host may participate in the meeting and sub-meetings. The host may be designated within a user interface presented to meeting participants. In some embodiments, the host is designated within a participant database storing information related to the meeting and the sub-meetings. In such instances, the host may be designated by a participant identification, a participating group identification, a name, a sub-host authority propriety, a meeting group identification, a related host, a main meeting identification to participate, and participating meeting identifications. Attributes of meeting group identifications targeted for participation and main meeting identifications of an initial state may be registered to the host. Sub-hosts may also be designated within the participant database. A plurality of sub-hosts may be secondary hosts or secondary meeting participants participating in the meeting and at least a portion of sub-meetings. Sub-hosts may be designated within the participant database with group member identifications indicating which sub-hosts can participate in sub-meetings using attentive listening following or attentive listening sharing. Sub-host identification and permissions or functionality may be designated by the host. In some instances, sub-hosts accept or deny participation or identification designated by the host.

In some embodiments, the keyword component 110 identifies the set of keywords by initially receiving one or more selections within a user interface. The one or more selections may represent designations of one or more keywords by the host of the meeting. The host may submit or enter the keywords into a user interface associated with the attentive listening system 102. In some embodiments, the keywords are entered in a text entry interface element or provided to the user interface by uploading a file of keywords. Once received by the keyword component 110, the one or more keywords may be stored in or used to generate an interest profile.

In such embodiments, the keyword component 110 identifies one or more extended keywords based on the one or more keywords received in the one or more selections. The keyword component 110 may identify the one or more extended keywords based on an extension flag selected by the host. The extension flag may also be preselected, allowing the host to deselect the extension flag where only specified keywords are desired. In response to identifying the extension flag, the keyword component 110 may perform a synonym search. The synonym search may be based on natural language processing, an ontological search, or any other suitable search methodology capable of automatically identifying related words. The related words may be identified, selected, and pruned by the keyword component 110. In some instances, a pruned set of extended keywords are presented to the host for confirmation before inclusion in the set of keywords.

The keyword component 110 may then generate the interest profile. The interest profile may be generated from the one or more selections and the one or more extended keywords. In such instances, the interest profile represents the set of keywords identified in operation 210. The interest profile may be stored in a profile database remote from a computing system of the host. In some instances, the profile database is stored on a server, cloud server, or other remote computing device. The profile database may store matters or keywords of interest defined by the host or defined by the host in cooperation with the keyword component 110. The interest profile and the profile database may use the matters or keywords as input for components of the attentive listening system 102. In some embodiments, weights may be defined or determined for the matters of interest or keywords of interest. For example, keyword weights may be selected from weights 1, 2, and 3. A keyword of primary interest may be registered or assigned a weight 3. Extended keywords may be assigned weights of 1, 2, or 3, based on a relatedness, closeness, or frequency relative to the one or more keywords received from the host. While example weights are described, it should be understood that any suitable weighting mechanism may be used. In some embodiments, the interest profile is stored in the profile database with an interest identification, an interest value, an audio supplement, and a weighted value.

In some embodiments, reactions may be registered within the interest profile. Reactions such as "like," "dislike," and other suitable selectable reactions may be registered in the interest profile, such that non-verbal participant interactions may be monitored and taken into consideration during sub-meetings. Reactions may be assigned a predetermined weight. For example, the "like" or "dislike" may be assigned a weight of 1.

At operation 220, the monitoring component 120 monitors remarks. In some embodiments, the remarks occur within a set of sub-meetings of the meeting. The set of sub-meetings may be break out sessions or other subdivisions of the meeting in which smaller groups of contributors interact. In some embodiments, each sub-meeting has a meeting designation.

The monitoring component 120 monitors remarks made within each sub-meeting of the set of sub-meetings. The monitoring component 120 may also monitor reactions to those remarks entered by attendees. In some instances, remarks made by the host or a sub-host within a sub-meeting are excluded from monitoring by the monitoring component 120. The monitoring component 120 may monitor the remarks using natural language processing of audible or textual remarks occurring within each sub-meeting. The monitoring component 120 may incorporate a natural language processor capable of parsing audible and textual comments, and identifying words or phrases within the comments or remarks.

At operation 230, the interest component 130 identifies one or more remarks of interest. In some embodiments, the one or more remarks of interest are identified by matching one or more keywords within the remarks of a sub-meeting of the set of sub-meetings. The interest component 130 may cooperate with the monitoring component 120 to determine words or phrases within the one or more remarks of interest match they keyword using natural language processing, keyword or root matching, or any other suitable comparison mechanism. Once the one or more remarks of interest are identified, the one or more remarks of interest are statistically recorded in an interest statistical database. The meeting designation of the sub-meeting in which the remarks of interest were identified may also be tagged as a meeting of interest.

In some embodiments, the interest component 130 identifies a keyword weight for each keyword of the set of keywords. The keyword weight may be designed within the interest profile and retrieved as remarks matching the keywords occur within the sub-meeting. Each instance of a remark containing or associated with a keyword may add to a value or weight of the sub-meeting.

In some embodiments, the interest component identifies remarks of interest in two or more sub-meetings of the set of sub-meetings. The interest component 130 compares remarks in the two or more sub-meetings containing remarks of interest.

At operation 240, the interest component 130 determines the one or more remarks of interest exceed an interest threshold. In some embodiments, the interest threshold is established prior to initiation of the meeting or the set of sub-meetings. For example, the interest threshold may be set at a weight for a keyword, a cumulative weight of keywords, or a cumulative weight for a specified time interval. For example, the interest threshold may be set at a value of 6. In such instances, the interest component 130 may determine the one or more remarks of interest exceed the interest threshold where two or more keywords with a weight of 3 are used or one keyword with a weight of 3 is used and three reactions are logged, with each reaction having a weight of 1.

In some embodiments, the interest threshold is a keyword weight threshold. The keyword weight threshold may indicate that a keyword of a specified weight has been identified within remarks of interest. For example, the keyword weight threshold may have a weight value of 3. Keywords having a weight value below 3 and occur in the remarks of interest may not trigger a determination of the remarks of interest exceeding the interest threshold.

In some embodiments, the one or more remarks of interest identified in operation 230 and a state of remarks of interest exceeding the interest threshold are stored in an interest statistical database. In such instances, the interest statistical database may store matters of interest remarked in meetings, at least a portion of the content of the remarks of interest, weights of keywords or remarks of interest, and other suitable and relevant statistical information. For example, the interest statistical database may store matters of interest with a meeting identification, an interest identification, an accumulated weighted value, a number of remarks, and a remark timestamp. The interest identification may link the matter of interest in the interest statistical database to an interest identification of one or more keywords within the interest profile and profile database. In some embodiments, the remark timestamp may include an initial remark timestamp at which the remark initially occurs within a sub-meeting, a final remark timestamp at which an instance of the remarks of interest end within the sub-meeting, a duration of the remarks within the sub-meeting, or combinations thereof.

For example, the interest component 130 may identify one or more remarks of interest from a set of sub-meetings. The set of sub-meetings may include two or more sub-meetings. Where the one or more remarks of interest are associated with a value or weight exceeding the interest threshold, the interest component 130 selects a first sub-meeting of the two or more sub-meetings as the sub-meeting, identified in operation 230, having the meeting designation to be presented to the host.

Upon determining the one or more remarks of interest exceed the interest threshold, the interest component 130 retrieves the meeting designation of the sub-meeting in which the one or more remarks of interest occur. The interest component 130 may also retrieve or generate a remark indication for the one or more remarks of interest. The interest component 130 may retrieve the meeting designation from a meeting database containing sub-meeting designations. In some embodiments, the interest component 130 also retrieves a participant identification for a participant or attendee associated with the one or more remarks of interest. The participant or attendee may have uttered or entered text comprising the remarks of interest. In some instances, the participant or attendee may be included in a group of attendees who uttered, entered text, or reacted to content of the sub-meeting which forms the remarks of interest. The interest component 130 may retrieve the participant or attendee identifiers from a participant database.

At operation 250, the interface component 140 presents the meeting designation and a remark indication to the host. The interface component 140 may present the meeting designation of the meeting of interest and the remark indication to the host in response to determining the one or more remarks of interest exceed the interest threshold. In some instances, the interface component 140 presents the meeting designation and the remark indication along with statistical information about one or more of the sub-meeting, the remarks of interest, and the keywords associated with the remarks of interest. The meeting designation may be presented as an identifier for the sub-meeting or a user interface presentation of the sub-meeting in process. The remark indication may be presented as a visual or textual representation of a keyword associated with the remark of interest. The meeting designation and remark indication may be presented to the host in real-time or near real-time as the remarks are being made within the ongoing set of sub-meetings.

In some embodiments, the interface component 140 presents the meeting designation and remark indication to the host in an attentive listening following format or an attentive listening sharing format. In such instances, the interface component 140 presents the meeting designation and remark indication in the attentive listening following function to the host and one or more sub-hosts. The sub-hosts may be in the same attentive listening state as the host, such that the sub-hosts designated for attentive listening following are presented the same meeting designation and remark indication and enables the sub-hosts to attentively listen to the same sub-meetings as the host upon identification of remarks of interest within the sub-meeting. In instances where the interface component 140 presents the meeting designation and remark indication in the attentive listening sharing function, the interface component 140 may present the meeting designation and remark indication to a sub-host designated to attentively listen to sub-meetings, remarks of interest, or specified keywords separately from the host. In such instances, the host being presented with the meeting designation and the remark indication may be any host or sub-host associated with the sub-meeting associated with the meeting designation or remarks of interest or keywords associated with the remark indication.

At operation 260, the interface component 140 modifies a user interface of the host. The interface component 140 may modify the user interface to present the sub-meeting as a primary sub-meeting within the user interface. For example, the interface component 140 may modify the user interface depicted in FIG. 4 to the user interface depicted in FIG. 5. The interface component 140 may modify the user interface of the host to provide the attentive listening function to the host. In some embodiments, the interface component 140 modifies the user interface to increase a volume of the primary sub-meeting with a suitable number of remarks of interest about keywords or a matter of interest to enable focused listening by the host.

In some embodiments, one or more operations of the method 200 are repeated. The operations may be repeated periodically, on demand, or in any suitable cycle. In some instances, upon completion of operation 260, the attentive listening system 102 accesses a cycle time. The cycle time may be set to a default value, set by the host, or determined based on one or more characteristic of the meeting or sub-meeting. For example, the cycle time may be set to a default value of one minute. Upon completion of operation 260, after the cycle time elapses, the attentive listening system 102 repeats one or more operations of the method 200. During the cycle time, the attentive listening system 102 may extract interest statistical processing data for a previous cycle completing of the method 200. The attentive listening system 102 may automatically select a meeting of a high level of interest based on the remarks of interest. For example, the weight of an interested keyword spoken by one or more participants may be multiplied by a weight of the keyword in meeting ID units to calculate a cumulative weight for the remarks of interest. The meeting ID may have a maximum value as a result of calculating the cumulative weight and may be treated as a meeting targeted for attentive listening. Based on the cumulative weight, the meeting may be initially selected as a meeting of interest for a next cycle of the operations of the method 200.

Figure 3:
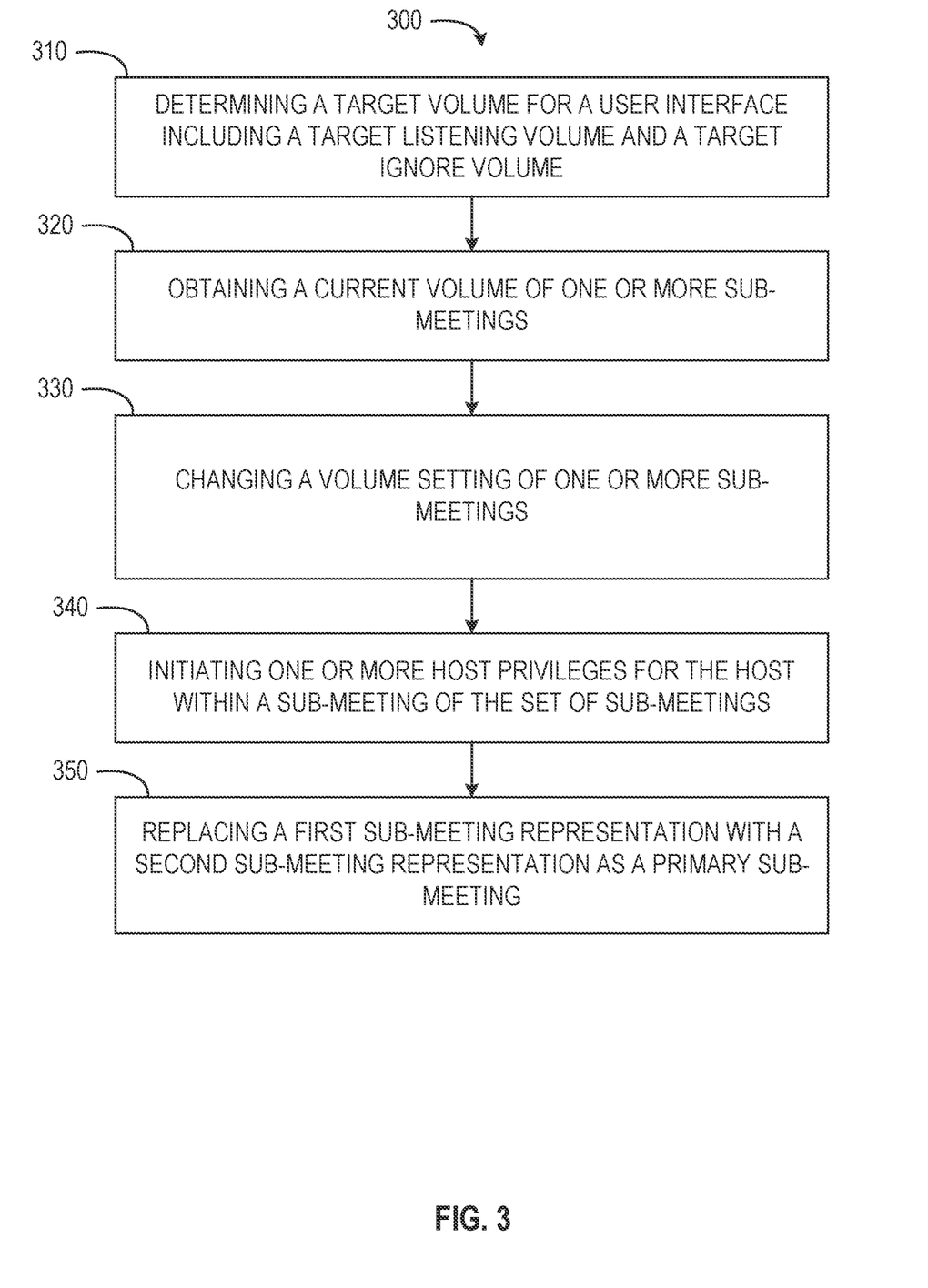
FIG. 3 depicts a flow diagram of a computer-implemented method for attentive listening in multiple contemporaneous meetings, according to at least one embodiment.

FIG. 3 shows a flow diagram of an embodiment of a computer-implemented method 300 for attentive listening in multiple contemporaneous meetings. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the interface component 140 determines a target volume for a user interface. In some embodiments, the target volume is established prior to initiation of the meeting or sub-meetings. In some instances, the target volume is a pair of volumes designated by a host or sub-host. The pair of volumes may include a target listening volume for sub-meetings designated for attentive listening and a target ignore volume for sub-meetings not designated for attentive listening.

Each host or sub-host may establish, set, or otherwise designate the target volume on a computing device associated with that host or sub-host. In some instances, the target volume is determined without intervention or action of the host or sub-host. In such instances, the target volume may be determined based on a current volume or system volume of a computing system of the host or sub-host. The interface component 140 may determine the target volume based on the current volume of the computing system, the current volume of the computing system and an ambient volume of an environment surrounding the computing system, the current volume and an audio output device presenting the audio output of the computing system, combinations thereof, or any other suitable current system information.

In some embodiments, the interface component 140 determines a target listening volume for the user interface. The interface component 140 may determine the target listening volume as a designated target volume set by the host prior to initiating the meeting or the sub-meeting. In such instances, the interface component 140 may access a volume profile set by the host or sub-host. The volume profile may be stored within a meeting profile or meeting database accessible by the interface component 140. In some embodiments, each host or sub-host establishes a volume profile for a computing system at which the host or sub-host is attending the meeting or sub-meetings. In some embodiments, the host establishes the volume profile for all sub-hosts. The interface component 140 may also determine the target listening volume as the current volume of a computing system of the host or sub-host. In such instances, the interface component 140 determines the current volume by accessing current system settings of the computing system of the host or sub-host.

In some embodiments, the interface component 140 determines a target ignore volume of the user interface. The interface component 140 may determine the target ignore volume as a designated target volume set by the host prior to initiating the meeting or sub-meeting. For example, the interface component 140 may access a volume profile, and select the target ignore volume within the target profile established by the host or sub-host. In some embodiments, the interface component 140 determines the target ignore volume based on the current volume of the computing system of the host or sub-host. The interface component 140 may determine the target ignore volume as a volume sufficiently below the current volume to enable the host to listen to a primary sub-meeting containing remarks of interest. The target ignore volume may be determined as a predefined value below the target listening volume. The target ignore volume may be automatically determined with a value of zero (e.g., muted), unless the default value of zero is modified by the host or sub-host.

In operation 320, the interface component 140 obtains a current volume of one or more sub-meetings. The current volume of the one or more sub-meetings may be a local current volume on a computing system of the host or sub-host. The current volume of the one or more sub-meetings may be obtained from a system volume setting, a browser or user interface setting, or any other suitable setting. The current volume of the one or more sub-meetings may be manually set, or automatically set by the attentive listening system 102. In some embodiments, the interface component 140 obtains a current volume for a sub-meeting designated as a meeting of interest. The current volume of the meeting of interest may be a default volume, a manually set volume of a meeting to which a user is currently listening, a current system volume, or any other suitable volume associated with the sub-meeting. In some embodiments, the interface component 140 obtains a current volume for at least a portion of sub-meetings of the set of sub-meetings. The portion of sub-meetings may be sub-meetings not designated or not yet designated as meetings of interest.

In operation 330, the interface component 140 changes a volume setting of one or more sub-meetings. The interface component 140 may change the volume setting of the one or more sub-meetings to a same volume. The interface component 140 may change the volume setting of one sub-meeting, while maintaining the volume setting of other sub-meetings. The interface component 140 may change the volume setting of one sub-meeting by increasing the volume value while reducing the volume setting of other sub-meetings.

In some embodiments, the interface component 140 changes the current volume of the sub-meeting or the meeting of interest. The interface component 140 may change the current volume of the meeting of interest to match the target listening volume of the user interface. In some embodiments, the interface component 140 changes the current volume of the portion of sub-meetings not yet designated as meetings of interest to match the target ignore volume of the user interface. In such instances, the interface component 140 may decrease the current volume of the portion of sub-meetings to a volume setting lower than that of the meeting of interest. The interface component 140 may reduce the current volume of the portion of sub-meetings to a value of zero (e.g., mute) or a non-zero value.

In some embodiments, the interface component 140 may obtain meeting identifications for sub-meetings not yet designated as meetings of interest or not selected for attentive listening. The sub-meetings for which meeting identifications are obtained may be meetings which hosts or sub-hosts are attending. The sub-meetings may also be meetings that one or more of a host or sub-host have attended, but are not currently attending. The interface component 140 may pass the meeting identifications for the sub-meetings to a meeting database. The meeting database may be updated periodically or in real-time to indicate meeting identifications of meetings currently targeted for attentive listening, previously targeted for attentive listening, or not yet targeted for attentive listening.

In operation 340, the interface component 140 initiates one or more host privileges for the host within a sub-meeting of the set of sub-meetings. The interface component 140 may initiate the host privileges within the sub-meeting identified as the meeting of interest. The host for which one or more host privileges are initiated may be a sub-host designated to attend the meeting of interest. In some instances, the host privileges are granted to a sub-host while the sub-host is engaged in active listening sharing functionality. Host privileges may include removal or reassignment of individuals from a sub-meeting or meeting. Host privileges may also include changing of interest profiles or keywords of interest. Although described with respect to specific functionality, it should be understood that host privileges may include any suitable and relevant privileges used by hosts in online meetings.

In operation 350, the interface component 140 replaces a first sub-meeting representation with a second sub-meeting representation. Initially the first sub-meeting representation may be a primary sub-meeting, previously indicated as a meeting of interest. The second sub-meeting representation may be a visual depiction of the sub-meeting associated with a meeting designation identified as a meeting of interest (e.g., a current meeting of interest). The interface component 140 may replace the sub-meeting representations in response to the interface component 140 presenting the meeting designation and the remark indication, as discussed in operation 250.

Figure 4:
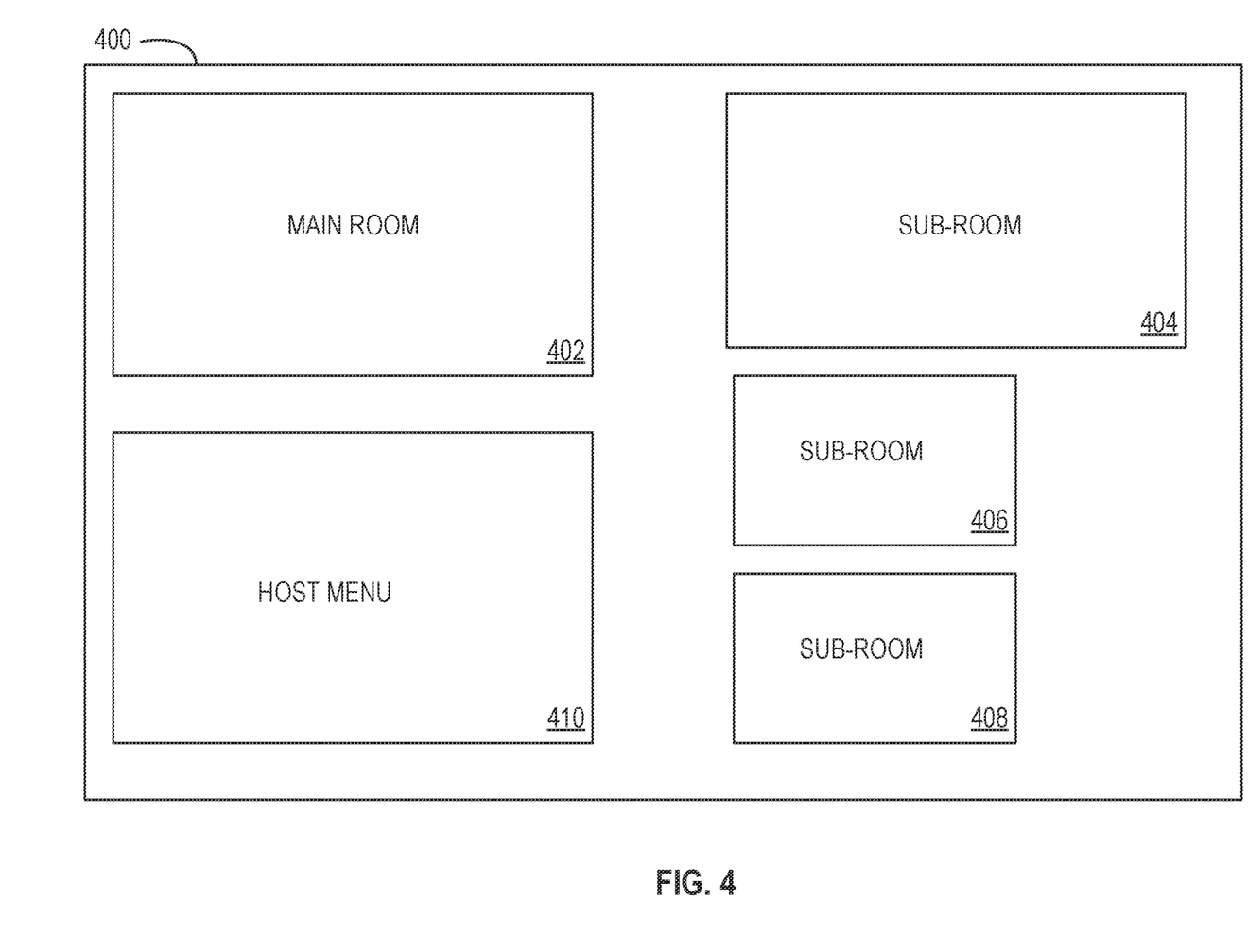
FIG. 4 depicts a user interface for attentive listening in multiple contemporaneous meetings, according to at least one embodiment.

As shown in FIG. 4, for example, a user interface 400 according to some embodiments of the attentive listening system 102. The user interface 400 includes a main room 402 for the meeting, a set of sub-rooms 404, 406, and 408 for the set of sub-meetings, and a host menu 410. The host menu 410 may present at least a portion of host privileges allotted to a host or sub-host viewing the user interface 400. The main room 402 may be a visualization of a meeting within the user interface 400. The set of sub-rooms 404, 406, and 408 may be visualizations of sub-meetings of the set of sub-meetings discussed in methods 200 and 300. In some instances, remarks made within each meeting or sub-meeting are converted into character strings and displayed within relevant visual depictions of rooms or sub-rooms. In some embodiments, specific character strings may be colored or displayed with an icon at the time of conversation. The coloring or icon of the special character strings may denote a real-time recognition of remarks of interest. The character strings may be presented as sub-titles or any other suitable representation of text within a visual depiction of a room or sub-room.

Figure 5:
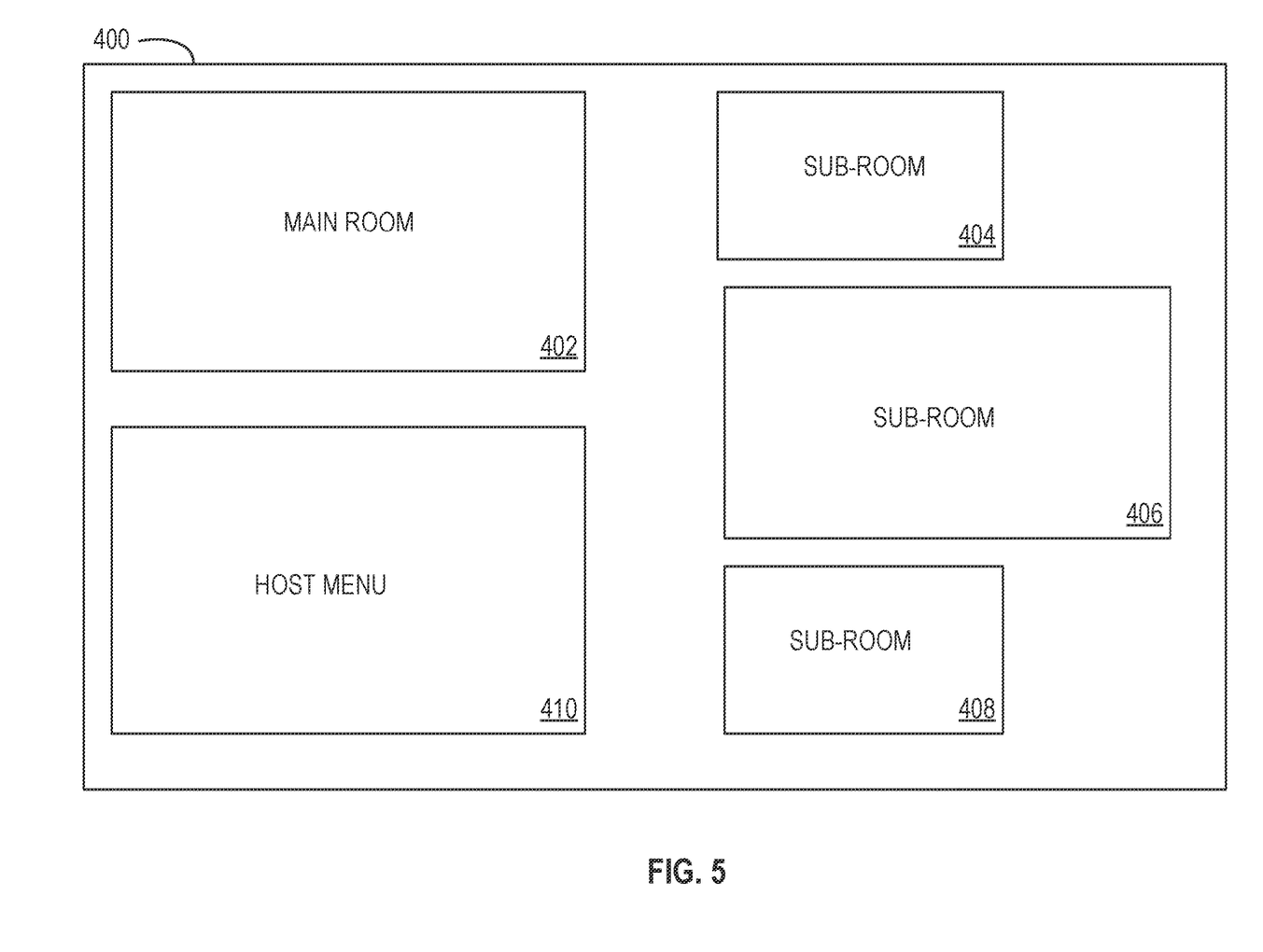
FIG. 5 depicts a user interface for attentive listening in multiple contemporaneous meetings, according to at least one embodiment

In operation 350, the interface component 140 may replace the first sub-meeting representation (e.g., sub-room 404) as the primary sub-meeting shown in FIG. 4. The interface component 140 may replace the sub-room 404 as the primary sub-meeting by reducing a size of the sub-room 404, as shown in FIG. 4, and enlarging a size of the sub-room 406, as shown in FIG. 5. While reducing the size of sub-room 404, the interface component 140 may also reduce or mute a volume associated with the sub-room 404 during operation 350. The sub-room 406 may represent the second sub-meeting as a visual depiction of the sub-meeting. The sub-room 406 may be enlarged and an audio stream of the sub-room 406 may be increased, by the interface component 140, to the target listening volume.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
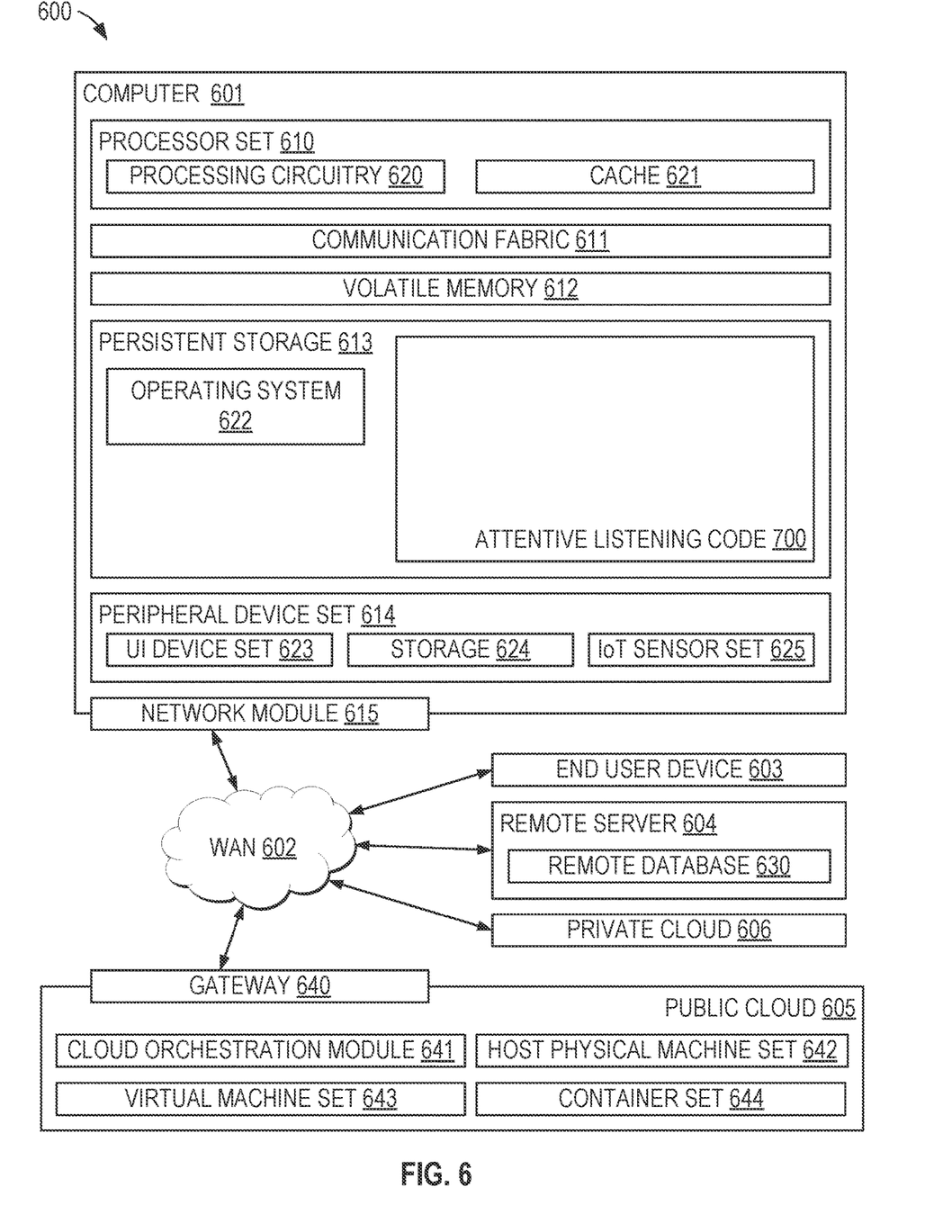
FIG. 6 depicts a schematic diagram of a computing environment for executing program code related to the methods disclosed herein and for attentive listening, according to at least one embodiment.

Embodiments of the present disclosure may be implemented together with virtually any type of computer, regardless of the platform is suitable for storing and/or executing program code. FIG. 6 shows, as an example, a computing environment 600 (e.g., cloud computing system) suitable for executing program code related to the methods disclosed herein and for attentive listening in multiple contemporaneous meetings. In some embodiments, the computing environment 600 may be the same as or an implementation of the computing environment 100.

Computing environment 600 contains an example of an environment for the execution of at least some of the computer code involved in performing the inventive methods, such as attentive listening code 700. The attentive listening code 700 may be a code-based implementation of the attentive listening system 102. In addition to attentive listening code 700, computing environment 600 includes, for example, a computer 601, a wide area network (WAN) 602, an end user device (EUD) 603, a remote server 604, a public cloud 605, and a private cloud 606. In this embodiment, the computer 601 includes a processor set 610 (including processing circuitry 620 and a cache 621), a communication fabric 611, a volatile memory 612, a persistent storage 613 (including operating a system 622 and the attentive listening code 700, as identified above), a peripheral device set 614 (including a user interface (UI) device set 623, storage 624, and an Internet of Things (IoT) sensor set 625), and a network module 615. The remote server 604 includes a remote database 630. The public cloud 605 includes a gateway 640, a cloud orchestration module 641, a host physical machine set 642, a virtual machine set 643, and a container set 644.

The computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 630. As is well understood in the art of computer technology, and depending upon the technology, performance of a computer-implemented method may be distributed among multiple computers and/or between multiple locations. On the other hand, in this presentation of the computing environment 600, detailed discussion is focused on a single computer, specifically the computer 601, to keep the presentation as simple as possible. The computer 601 may be located in a cloud, even though it is not shown in a cloud in FIG. 1. On the other hand, the computer 601 is not required to be in a cloud except to any extent as may be affirmatively indicated.

The processor set 610 includes one, or more, computer processors of any type now known or to be developed in the future. The processing circuitry 620 may be distributed over multiple packages, for example, multiple, coordinated integrated circuit chips. The processing circuitry 620 may implement multiple processor threads and/or multiple processor cores. The cache 621 is memory that is located in the processor chip package(s) and is typically used for data or code that should be available for rapid access by the threads or cores running on the processor set 610. Cache memories are typically organized into multiple levels depending upon relative proximity to the processing circuitry. Alternatively, some, or all, of the cache for the processor set may be located "off chip." In some computing environments, the processor set 610 may be designed for working with qubits and performing quantum computing.

Computer readable program instructions are typically loaded onto the computer 601 to cause a series of operational steps to be performed by the processor set 610 of the computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 621 and the other storage media discussed below. The program instructions, and associated data, are accessed by the processor set 610 to control and direct performance of the inventive methods. In the computing environment 600, at least some of the instructions for performing the inventive methods may be stored in the attentive listening code 700 in the persistent storage 613.

The communication fabric 611 is the signal conduction path that allows the various components of the computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 612 is any type of volatile memory now known or to be developed in the future. Examples include dynamic type random access memory (RAM) or static type RAM. Typically, the volatile memory 612 is characterized by random access, but this is not required unless affirmatively indicated. In the computer 601, the volatile memory 612 is located in a single package and is internal to the computer 601, but, alternatively or additionally, the volatile memory may be distributed over multiple packages and/or located externally with respect to the computer 601.

The persistent storage 613 is any form of non-volatile storage for computers that is now known or to be developed in the future. The non-volatility of this storage means that the stored data is maintained regardless of whether power is being supplied to the computer 601 and/or directly to the persistent storage 613. The persistent storage 613 may be a read only memory (ROM), but typically at least a portion of the persistent storage allows writing of data, deletion of data and re-writing of data. Some familiar forms of persistent storage include magnetic disks and solid-state storage devices. The operating system 622 may take several forms, such as various known proprietary operating systems or open-source Portable Operating System Interface-type operating systems that employ a kernel. The code included in the attentive listening code 700 typically includes at least some of the computer code involved in performing the inventive methods.

The peripheral device set 614 includes the set of peripheral devices of the computer 601. Data communication connections between the peripheral devices and the other components of the computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 623 may include components such as a display screen, speaker, microphone, wearable devices (such as goggles and smart watches), keyboard, mouse, printer, touchpad, game controllers, and haptic devices. The storage 624 is external storage, such as an external hard drive, or insertable storage, such as an SD card. The storage 624 may be persistent and/or volatile. In some embodiments, the storage 624 may take the form of a quantum computing storage device for storing data in the form of qubits. In embodiments where the computer 601 is required to have a large amount of storage (for example, where the computer 601 locally stores and manages a large database) then this storage may be provided by peripheral storage devices designed for storing very large amounts of data, such as a storage area network (SAN) that is shared by multiple, geographically distributed computers. The IoT sensor set 625 is made up of sensors that can be used in Internet of Things applications. For example, one sensor may be a thermometer and another sensor may be a motion detector.

The network module 615 is the collection of computer software, hardware, and firmware that allows the computer 601 to communicate with other computers through the WAN 602. The network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 615 are performed on the same physical hardware device. In other embodiments (for example, embodiments that utilize software-defined networking (SDN)), the control functions and the forwarding functions of the network module 615 are performed on physically separate devices, such that the control functions manage several different network hardware devices. Computer readable program instructions for performing the inventive methods can typically be downloaded to the computer 601 from an external computer or external storage device through a network adapter card or network interface included in the network module 615.

The WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 603 is any computer system that is used and controlled by an end user (for example, a customer of an enterprise that operates the computer 601), and may take any of the forms discussed above in connection with the computer 601. The EUD 603 typically receives helpful and useful data from the operations of the computer 601. For example, in a hypothetical case where the computer 601 is designed to provide a recommendation to an end user, this recommendation would typically be communicated from the network module 615 of the computer 601 through the WAN 602 to the EUD 603. In this way, the EUD 603 can display, or otherwise present, the recommendation to an end user. In some embodiments, the EUD 603 may be a client device, such as thin client, heavy client, mainframe computer, desktop computer and so on.

The remote server 604 is any computer system that serves at least some data and/or functionality to the computer 601. The remote server 604 may be controlled and used by the same entity that operates computer 601. The remote server 604 represents the machine(s) that collect and store helpful and useful data for use by other computers, such as the computer 601. For example, in a hypothetical case where the computer 601 is designed and programmed to provide a recommendation based on historical data, then this historical data may be provided to the computer 601 from the remote database 630 of the remote server 604.

The public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 605 is performed by the computer hardware and/or software of the cloud orchestration module 641. The computing resources provided by the public cloud 605 are typically implemented by virtual computing environments that run on various computers making up the computers of the host physical machine set 642, which is the universe of physical computers in and/or available to the public cloud 605. The virtual computing environments (VCEs) typically take the form of virtual machines from the virtual machine set 643 and/or containers from the container set 644. It is understood that these VCEs may be stored as images and may be transferred among and between the various physical machine hosts, either as images or after instantiation of the VCE. The cloud orchestration module 641 manages the transfer and storage of images, deploys new instantiations of VCEs and manages active instantiations of VCE deployments. The gateway 640 is the collection of computer software, hardware, and firmware that allows the public cloud 605 to communicate through the WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 606 is similar to the public cloud 605, except that the computing resources are only available for use by a single enterprise. While the private cloud 606 is depicted as being in communication with the WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 605 and the private cloud 606 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments, one or more of the operating system 622 and the attentive listening code 700 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a set of keywords designated by a host of a meeting;
   monitoring remarks in a set of sub-meetings of the meeting;

identifying one or more remarks of interest matching one or more keywords within the remarks of a sub-meeting of the set of sub-meetings, the sub-meeting having a meeting designation;

determining the one or more remarks of interest exceed an interest threshold;

presenting the meeting designation and a remark indication to the host in response to determining the one or more remarks of interest exceed the interest threshold; and modifying a user interface of the host by presenting the sub-meeting as a primary sub-meeting within the user interface, and obtaining a current volume of the sub-meeting and a target listening volume of the user interface and changing the current volume of the sub-meeting to match the target listening volume of the user interface.

2. The method of claim 1, wherein modifying the user interface further comprises:

minimizing sub-meetings not designated for attentive listening in the user interface.

3. The method of claim 1, wherein modifying the user interface further comprises:

initiating one or more host privileges for the host within the sub-meeting.

4. The method of claim 1, wherein modifying the user interface further comprises:

determining a target ignore volume of the user interface;

obtaining a current volume for at least a portion of the set of sub-meetings; and changing the current volume of the portion of the set of sub-meetings to match the target ignore volume.

5. The method of claim 1, wherein modifying the user interface further comprises:

in response to presenting the meeting designation and the remark indication, replacing a first sub-meeting representation with a second sub-meeting representation, the second sub-meeting representation being a visual depiction of the sub-meeting associated with the meeting designation.

6. The method of claim 1, wherein identifying the set of keywords further comprises:

receiving one or more selections within a user interface, the one or more selections representing designations of one or more keywords by the host;

identifying one or more extended keywords based on the one or more keywords; and generating an interest profile from the one or more selections and the one or more extended keywords, the interest profile representing the set of keywords.

7. The method of claim 1, further comprising:

identifying a keyword weight for each keyword of the set of keywords;

comparing remarks in two or more sub-meetings containing remarks of interest; and selecting a first sub-meeting of the two or more sub-meetings as the sub-meeting having the meeting designation to be presented to the host.

8. A system, comprising:

one or more processors; and a computer-readable storage medium, coupled to the one or more processors, storing program instructions that, when executed by the one or more processors, cause the one or more processors to perform operations comprising:

identifying a set of keywords designated by a host of a meeting;

monitoring remarks in a set of sub-meetings of the meeting;

identifying one or more remarks of interest matching one or more keywords within the remarks of a sub-meeting of the set of sub-meetings, the sub-meeting having a meeting designation;

determining the one or more remarks of interest exceed an interest threshold;

presenting the meeting designation and a remark indication to the host in response to determining the one or more remarks of interest exceed the interest threshold; and modifying a user interface of the host by presenting the sub-meeting as a primary sub-meeting within the user interface, and obtaining a target ignore volume of the user interface and changing a current volume of one or more sub-meetings not designated for attentive listening to match the target ignore volume of the user interface.

9. The system of claim 8, wherein the operations further comprise:

minimizing sub-meetings not designated for attentive listening in the user interface.

10. The system of claim 8, wherein modifying the user interface further comprises:

determining a target listening volume of the user interface;

obtaining a current volume of the sub-meeting;

changing the current volume of the sub-meeting to match the target listening volume; and initiating one or more host privileges for the host within the sub-meeting.

11. The system of claim 8, wherein obtaining the target ignore volume of the user interface further comprises:

obtaining the target ignore volume of the user interface from a volume profile.

12. The system of claim 8, wherein modifying the user interface further comprises:

in response to presenting the meeting designation and the remark indication, replacing a first sub-meeting representation with a second sub-meeting representation, the second sub-meeting representation being a visual depiction of the sub-meeting associated with the meeting designation.

13. The system of claim 8, wherein identifying the set of keywords further comprises:

receiving one or more selections within a user interface, the one or more selections representing designations of one or more keywords by the host;

identifying one or more extended keywords based on the one or more keywords; and generating an interest profile from the one or more selections and the one or more extended keywords, the interest profile representing the set of keywords.

14. The system of claim 8, wherein the operations further comprise:

identifying a keyword weight for each keyword of the set of keywords;

comparing remarks in two or more sub-meetings containing remarks of interest; and selecting a first sub-meeting of the two or more sub-meetings as the sub-meeting having the meeting designation to be presented to the host.

15. A computer program product comprising a computer readable storage medium having program instructions embodied therewith, the program instructions being executable by one or more processors to cause the one or more processors to perform operations comprising:
- identifying a set of keywords designated by a host of a meeting;
- monitoring remarks in a set of sub-meetings of the meeting;
- identifying one or more remarks of interest matching one or more keywords within the remarks of a sub-meeting of the set of sub-meetings, the sub-meeting having a meeting designation;
- determining the one or more remarks of interest exceed an interest threshold;
- presenting the meeting designation and a remark indication to the host in response to determining the one or more remarks of interest exceed the interest threshold; and
- modifying a user interface of the host by presenting the sub-meeting as a primary sub-meeting within the user interface, changing a current volume of the sub-meeting to match a target listening volume of the user interface, and changing a current volume of one or more sub-meetings not designated for attentive listening to match a target ignore volume of the user interface.

16. The computer program product of claim 15, wherein the operations further comprise:
- minimizing sub-meetings not designated for attentive listening in the user interface.

17. The computer program product of claim 15, wherein the operations further comprise:
- initiating one or more host privileges for the host within the sub-meeting.

18. The computer program product of claim 15, wherein the operations further comprise:
- obtaining the target ignore volume of the user interface from a volume profile.

19. The computer program product of claim 15, wherein the operations further comprise:
- in response to presenting the meeting designation and the remark indication, replacing a first sub-meeting representation with a second sub-meeting representation, the second sub-meeting representation being a visual depiction of the sub-meeting associated with the meeting designation.

20. The computer program product of claim 15, wherein the operations further comprise:
- identifying a keyword weight for each keyword of the set of keywords;
- comparing remarks in two or more sub-meetings containing remarks of interest; and
- selecting a first sub-meeting of the two or more sub-meetings as the sub-meeting having the meeting designation to be presented to the host.

* * * * *